United States Patent [19]

Fick et al.

[11] Patent Number: 5,012,764
[45] Date of Patent: May 7, 1991

[54] ANIMAL PROTECTIVE COLLAR

[75] Inventors: Therese A. Fick, Marine; Byron D. Fair, Stillwater, both of Minn.

[73] Assignee: Minnesota Mining and Manufacturing Company, St. Paul, Minn.

[21] Appl. No.: 558,166

[22] Filed: Jul. 26, 1990

[51] Int. Cl.⁵ .............................................. A01K 27/00
[52] U.S. Cl. ............................ 119/106; 128/DIG. 15
[58] Field of Search ................. 119/96, 106, 129, 143; 24/306, 444, 447, 448; 128/DIG. 15

[56] References Cited

U.S. PATENT DOCUMENTS

| | | | |
|---|---|---|---|
| 3,013,530 | 12/1961 | Zeman | 119/106 |
| 3,036,554 | 5/1962 | Johnson | 119/106 X |
| 3,072,098 | 1/1963 | Boemle | 119/106 |
| 3,423,764 | 1/1969 | Cassling | 24/444 X |
| 3,453,696 | 7/1969 | Mates | 24/306 X |
| 3,849,840 | 11/1974 | Yamada et al. | 24/448 |
| 3,942,306 | 3/1976 | Kulka | 54/80 |
| 4,200,057 | 4/1980 | Agar | 119/96 X |
| 4,216,257 | 8/1980 | Shams et al. | 24/448 X |
| 4,290,174 | 9/1981 | Kalleberg | 24/444 |
| 4,328,605 | 5/1982 | Hutchison et al. | 24/115 |
| 4,413,588 | 11/1983 | Lindholm | 119/106 X |
| 4,476,814 | 10/1984 | Miller | 119/106 |

OTHER PUBLICATIONS

"Buster", Disposable Collars, p. 54, of Jorgensen Laboratories, Inc., 1990 Catalog (entire chapter XIV, pp. 48–58 provided).

Assorted Collars at Catalog, pp. 2, 11–14, of Ejay International, Inc., Summer 1989, Catalog (entire catalog, pp. 1–20 provided).

*Primary Examiner*—Robert P. Swiatek
*Assistant Examiner*—Todd E. Manahan
*Attorney, Agent, or Firm*—Gary L. Griswold; Walter N. Kirn; Philip M. Goldman

[57] ABSTRACT

A custom-fittable, protective collar assembly for animals, useful for preventing contact beteen the animal's head and other parts of its body. Also described is a method of fitting such a collar assembly in order to ensure compliant reapplication after the collar has been removed from the animal's neck. The collar assembly includes a substantially flat collar-forming sheet of resiliently flexible material, together with a positionable closure assembly such as a positionable hook and loop fastening system.

6 Claims, 2 Drawing Sheets

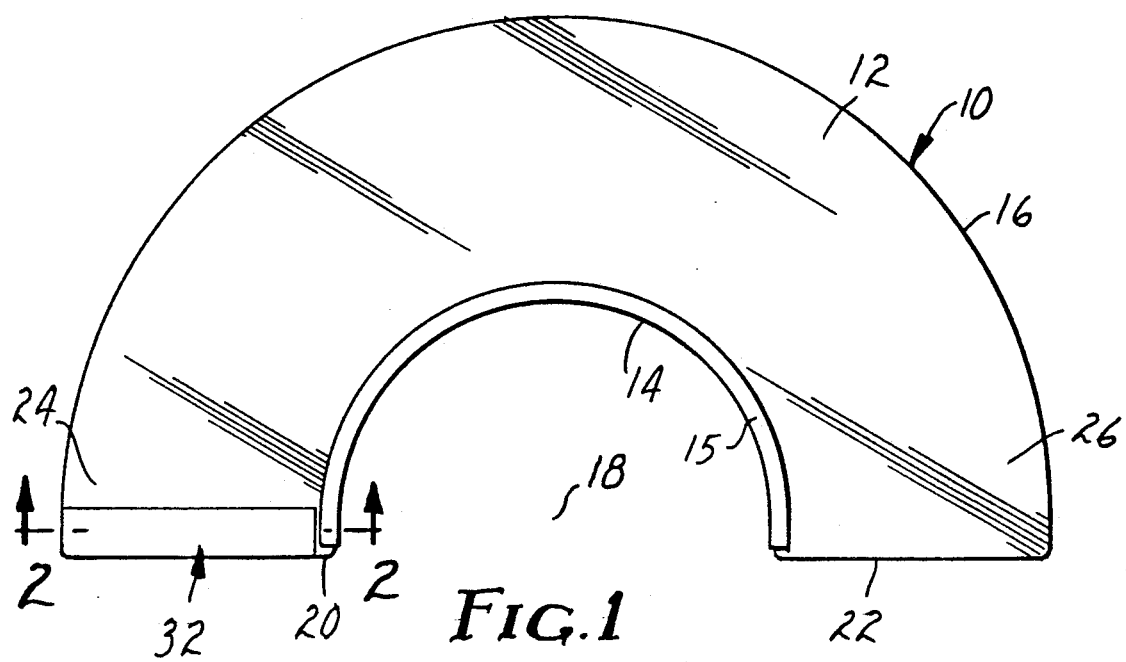
FIG. 1
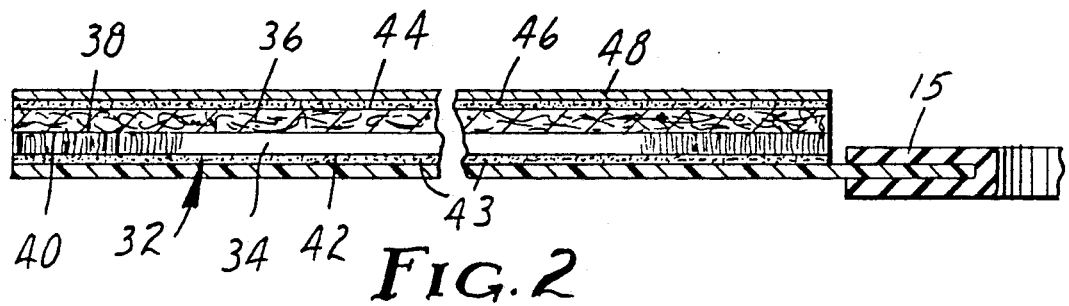
FIG. 2
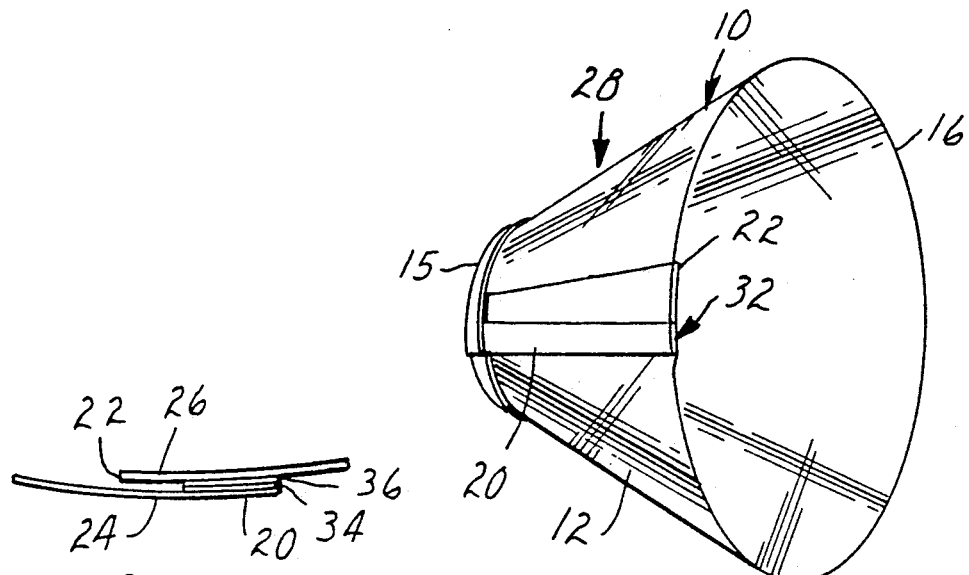
FIG. 4
FIG. 3

ANIMAL PROTECTIVE COLLAR

TECHNICAL FIELD

The present invention relates to a temporary, protective collar that can be applied to the neck of an animal to prevent contact between the animal's head and other parts of its body. The collar is useful, for instance, after surgery to allow wounds to heal or to allow topical medications to be applied in a manner that will not be disturbed by the animal.

BACKGROUND ART

Protective collars, often called "Elizabethan" collars in view of the appearance that some have when in place, have long been used in veterinary medicine to protect against contact between an animal's head and other parts of its body. The collars are used, for instance, after surgery to prevent an animal from biting or chewing at dressings or areas below its neck, or from pawing or scratching at dressings or areas on or about its head.

Frequently such collars have taken the general form of truncated cones. Such collars have been closed and thereby retained in place around the animal's neck by such things as interlocking tabs, snaps, lacing, staples, and the like. Such collars frequently need to be offered in a variety of sizes or size ranges to accommodate animals of various sizes, and the effective size range of a particular collar is often limited by the closure mechanism used. Such closure mechanisms are also frequently cumbersome and time-consuming to use.

Examples of such collars include "Buster" disposable collars, available from Jorgensen Laboratories (Denmark); "Saf-T Shield" TM collars for birds and for small research animals, "Disposable Budget Collars" for small animals, and "EJAY Saf-T-Shield" collars, each available from Ejay International, Inc., Glendora, CA.

Other devices along these lines have been described, for instance, in U.S. Pat. Nos. 3,013,530, 3,072,098, 3,036,554, 3,942,306, 4,328,605, and 4,476,814.

Other closure mechanisms that have been used or proposed involve the use of VELCRO type closures provided on both ends of a collar, for instance of the type used with "Saf-T Shield" collars available from Ejay International, Inc., Glendale, CA. After initial fitting by the veterinarian however, such collars do not necessarily ensure compliant reapplication by the animal's owner, since the collars can be reapplied in essentially any of the sizes that were originally possible. Deliberate measures must be taken therefore, such as marking proper positions on the collar, if compliant reapplication is to be attempted.

What is needed is a collar that is quickly, easily, and accurately fittable and removable in a manner that ensures that reapplication will be done in a compliant manner.

SUMMARY OF THE INVENTION

The present invention provides a custom-fittable, protective collar assembly capable of being fitted, removed, and thereafter reapplied in a compliant manner, the collar assembly comprising:

(1) a substantially flat collar-forming sheet of resiliently flexible material having inner and outer arcuate edges generally concentric about a common axis, the edges extending between first and second ends of the sheet, the sheet being adapted to be bent in order to overlap portions of the sheet adjacent the ends, thereby forming the material into the shape of a truncated cone with a substantial portion of the inner edge adapted to fit around the animal, and (2) first and second elongate closure members, each of the closure members having an attachment surface adapted for releasable engagement with the attachment surface of the other closure member, each of the closure members also having a surface opposite their attachment surface, the first closure member being attached at its opposite surface to a portion of the sheet adjacent one of the ends and extending generally radially of the common axis, the second elongate member being releasably engaged to the first elongate member and having a layer of pressure sensitive adhesive on its opposite surface substantially covered by a releasable liner, whereby the assembly can be bent around the neck of an animal, with portions of the sheet adjacent the first and second ends overlapped to provide the releasable liner facing a desired location of an overlapping portion of sheet material, in order to form the material into the shape of a truncated cone with a substantial portion of the inner edge adapted to fit the neck of the animal;

the releasable liner can be removed to expose the adhesive layer and the exposed adhesive layer adhered by pressure at the desired location on the overlapping sheet material in order to retain the assembly in its fitted shape around the neck of the animal; and the engagement of the elongate closure members can be released and the assembly removed from the neck of the animal in a manner such that the assembly can be later bent again around the neck of the animal, and the elongate closure members again engaged to achieve substantially the same fit as that originally made.

In one preferred embodiment the first and second elongate closure members are provided as the hook and loop mating partners of fasteners such as those presently available under the tradename "Scotchmate TM" hook and loop fastening systems by the 3M Company, St. Paul, MN.

Preferably the inner edge of the collar assembly, i.e., the edge that will contact the neck of the animal when the collar is formed, is padded in order to provide further comfort and protection for the animal.

A collar assembly of the present invention provides significant advantages, e.g., with respect to ease of use, reduced fitting time, and accuracy of fit. In particular, compliance is improved using a collar assembly of the present invention, since the collar assembly can be easily removed by the animal owner, yet can only be reapplied in a size that has substantially the same fit as that originally determined by the veterinarian.

The present invention also provides a method of fitting a protective animal collar in order to ensure compliant reapplication, involving the use of a collar assembly as described herein.

BRIEF DESCRIPTION OF THE DRAWING

FIG. 1 is a plan view of a collar assembly of the invention in its flat sheet-like form.

FIG. 2 is a cross-sectional view of an end of the collar assembly of FIG. 1 taken approximately along lines 2—2.

FIG. 3 is a perspective view of the collar assembly of FIG. 1 formed into the shape of a truncated cone.

FIG. 4 is a partial end view of the overlapping portions of the collar assembly of FIG. 3.

DETAILED DESCRIPTION

Figure 5:
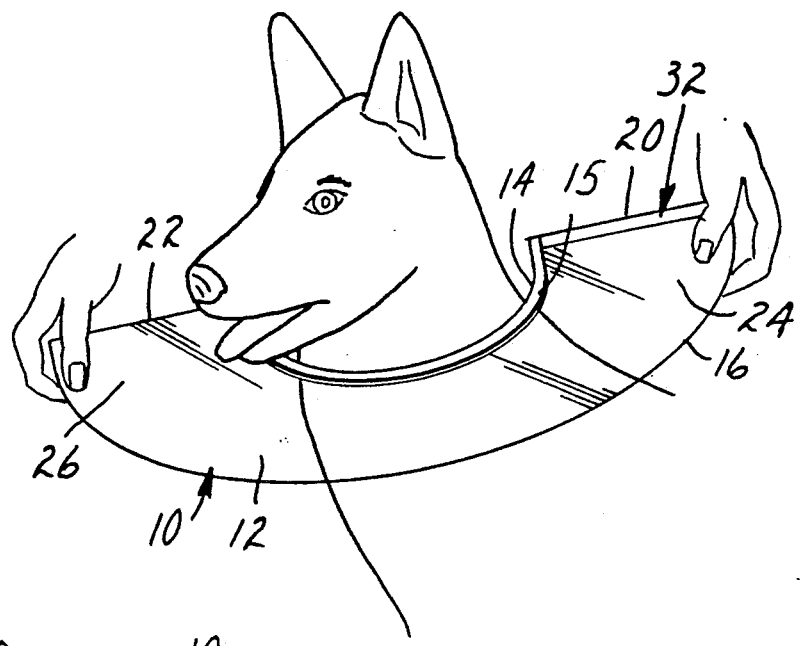
FIG. 5 is a perspective view of a collar assembly in the process of being fitted to the neck of an animal.

The present invention provides a custom-fittable, protective collar assembly for animals. The collar assembly is capable of being fitted to an animal's neck and thereafter removed and re-applied in a manner that ensures compliance. As used in the present specification, the word "fit" and inflections thereof refers to the bending and retaining of a collar assembly in the form of a truncated cone around the neck of a particular animal in a manner such that the collar assembly provides a desired combination of such properties as comfort and permanence. The word "compliance", and inflections thereof, as used in the present specification, refers to the ability of an owner or other care-giver to later remove and reapply a collar assembly in order to achieve substantially the same fit as that originally obtained.

A preferred collar assembly of the invention will be described with reference to the drawing.

As shown in FIG. 1, collar assembly 10 comprises a substantially flat collar-forming sheet 12 of resiliently flexible material having inner (14) and outer (16) arcuate edges generally concentric about common axis 18. Edges 14 and 16 extend between first (20) and second (22) ends of sheet 12. Sheet 12 is adapted to be bent in order to overlap portions 24 and 26 of sheet 12 adjacent ends 20 and 22, thereby forming sheet 10 into the shape of truncated cone 28 shown in FIG. 3. A substantial portion of inner edge 14 defines a smaller diameter of truncated cone 28. This smaller diameter is adaptable by the user to fit the neck of an animal by suitable adjustment of the extent of overlap of portions 24 and 26. Collar assembly 10 is retained in its fitted shape by the use of closure assembly 32, described in greater detail below.

Referring now to FIG. 2, collar assembly 10 further comprises first (34) and second (36) elongate closure members of closure assembly 32 having attachment surfaces 38 and 40, respectively. Closure members 34 and 36 are adapted for releasable engagement between attachment surfaces 38 and 40. Each of closure members 34 and 36 also have a surface, 42 and 44, opposite their respective attachment surfaces.

Also shown in FIGS. 1 and 2 is optional padding 15, which substantially covers and cushions the length of inner edge 14 in order to provided additional comfort and protection for contact with the animal's neck. A preferred form of padding, as depicted, involves the use of a U-shaped piece of resilient material having embedded aluminum clips that can be crimped in order to retain the material onto inner edge 14.

Referring to FIGS. 1 and 2, closure assembly 32 is attached adjacent end 20 of sheet 12, and extending generally radially of axis 18, by means of adhesive layer 43 on opposite surface 42 of closure member 34. In FIG. 2 second elongate member 36 is shown releasably engaged to first elongate member 34, its opposite surface 44 having coating 46 of pressure sensitive adhesive thereon, adhesive layer 46 being substantially covered by a releasable liner 48.

FIGS. 3 and 4 depict the collar assembly of FIG. 1 in its closed form, although not in position around the neck of an animal. FIG. 3 depicts the collar assembly after it has been bent and retained into the shape of a truncated cone. A substantial portion of the inner edge 14 (shown in FIG. 1) defines a smaller diameter of the truncated cone adapted to fit the neck of an animal. The collar assembly is retained in this shape by the releasable engagement of closure assembly 32. As seen in FIG. 4, first closure member 34 is attached adjacent the first end 20 of sheet material 12. Second closure member 36 has been attached at the desired location on the overlapping end portion 26.

Fitting of a collar assembly of the present invention will be described with reference to FIGS. 5 through 7.

Figure 6:
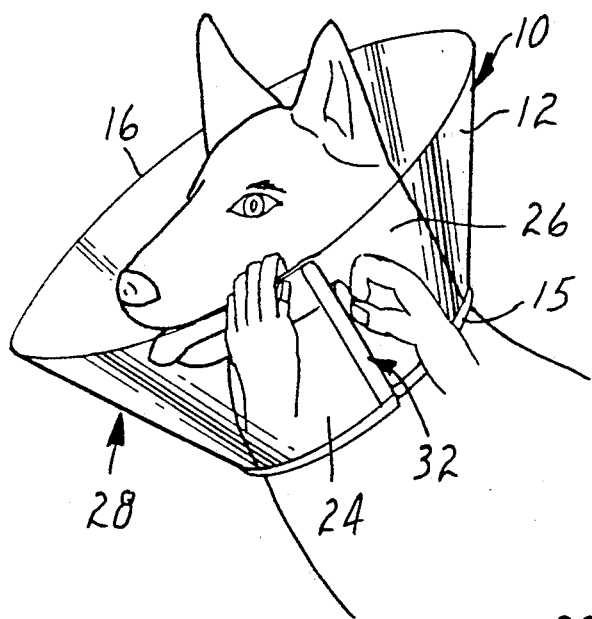
FIG. 6 is a perspective view of the collar assembly of FIG. 5 as the releasable liner is removed from the pressure sensitive adhesive backing layer of the second closure member.

In FIGS. 5 and 6, collar assembly 10 is shown before and after being bent around the neck of an animal into the shape of truncated cone 28 with a portion of inner edge 14 overlapped to define a diameter adapted to fit the neck of the animal. The collar assembly overlaps at least far enough to provide a sufficient width for the placement of substantially the entire elongate closure member on the surface facing the paired closure members.

FIG. 6 further shows adhesive liner 48 being removed from second closure member as the collar assembly is held in substantially its fitted shape, in order to expose the underlying adhesive layer.

Alternatively, the proper position of the elongate closure member can be marked on the surface, e.g. with a marking pen, and the collar assembly removed. The second elongate closure member can then be adhered by reference to the earlier made mark.

Figure 7:
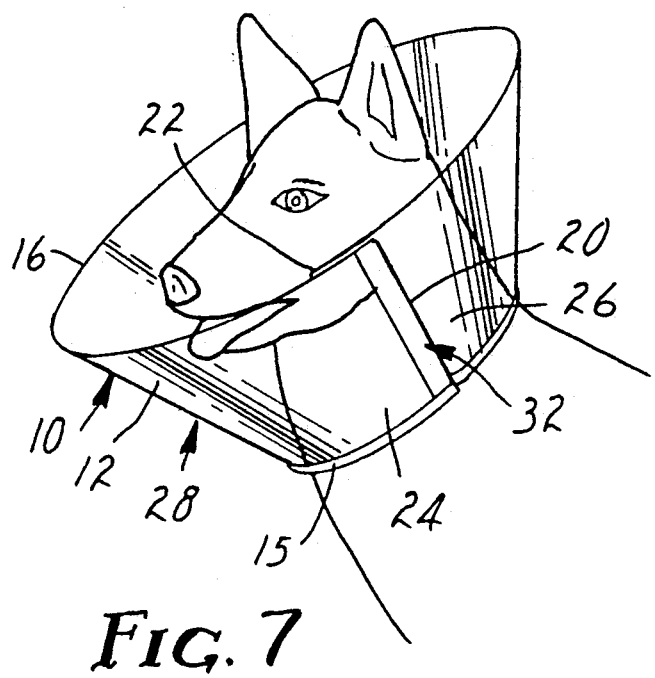
FIG. 7 is a perspective view of the collar assembly of FIG. 6 after the adhesive layer of the second closure member has been adhered at a desired location to a portion adjacent the second end of the collar assembly, showing the collar assembly closed by the engaged closure members.

In FIG. 7, the fitted collar assembly 10 is shown after the exposed adhesive layer has been positioned and adhered by pressure to portion 26 of second end 22 of sheet 12, thereby retaining collar assembly 10 in the form of truncated cone 28 around the neck of the animal. As used herein, the word "positioned" and inflections thereof refers to the ability to permanently place at least one of the closure members in a desired location on the sheet material in the course of fitting the collar assembly.

After fitting and retaining the collar assembly, any excess sheet material can optionally be removed, e.g., material that extends past the newly-adhered closure member and toward the second end. The excess material can be removed in any suitable manner, e.g., the collar assembly can be briefly removed and the excess material can be cut with a scissors. Optionally, other measures can be taken to remove excess sheet material, for instance, the second end can be provided with a series of equally spaced perforated lines extending radially from axis 18 in FIG. 1. Any perforated line beyond the newly-adhered second closure member can then be folded until the material can be broken along the line and the excess material removed.

Although not shown, the engagement of the closure members can be released by manually pulling them apart, in order to remove the collar assembly from the neck of the animal. In view of the permanent positioning of both closure members on the sheet material, the collar assembly can later be re-applied around the neck of the animal in a manner that ensures substantially the same fit as that originally made.

Collar assemblies of the present invention can be made of any suitable materials. The sheet material itself is generally prepared from material having the desired combination of such properties as resilience, flexibility, weight, density, visual clarity, durability, and color.

Applicants have found that collar assemblies that are substantially visually clear allow the animal to have a broader range of vision, and thereby appear to lessen the anxiety of the animal and improve the collar's effectiveness.

Examples of suitable sheet materials meeting the above criteria include, but are not limited to, those prepared from organic and inorganic polymeric substrates, woven and non-woven fabrics, papers such as cardboard, and metals.

Examples of preferred sheet materials include, but are not limited to, polymeric sheet materials such as those prepared from thermoplastic or thermosetting resins capable of forming flexible films, including: thermoplastic resins and polymers such as polyamides (e.g., nylons); polycarbonates (e.g., "Lexan", which is described as a polycarbonate condensation product of bisphenol A and phosgene); polyalkenes and their copolymers (e.g., polyethylenes, polypropylenes, polystyrenes); polyvinyls (e.g., polyvinyl chloride); and polyesters (e.g., polyethylene terephthalate).

As will become apparent to those skilled in the art, collar assemblies can be made in any suitable size and configuration for its intended use, for example for application to animals on the order of birds, rodents, larger laboratory animals such as rabbits, small dogs and cats, larger dogs. For instance the final neck diameter of the fitted, retained collar assembly will generally be on the order of 1 to 5 centimeters for use with birds; on the order of 2 to 10 centimeters for rodents; on the order of 3 to 10 centimeters for larger laboratory animals such as guinea pigs and rabbits; on the order of 5 to 12 centimeters for smaller pets such as dogs and cats, and on the order of 10 to 20 centimeters for larger pets.

Correspondingly, the initial dimensions of the collar assemblies will become readily apparent to those skilled in the art. Dimensions suitable to obtain the desired neck diameter and provide sufficient protection for the animal, e.g., in terms of the length of the inner and outer edges and the width of the sheet. The thickness of the sheet material will depend on the properties of the material chosen including the desired flexibility, resilience, and strength. Suitable thicknesses generally range on the order of about 0.1 mm to about 1 mm, and preferably from about 0.2 mm to about 0.8 mm.

Suitable elongate closure members provide an optimal combination of such properties as strength of engagement, releasability, durability, flexibility, conformability. Suitable closure assemblies are the separable "hook" and "loop"-type fastening devices as described, for instance, in U.S. Pat. Nos. 2,717,437 and 3,009,235, the disclosures of which are hereby incorporated by reference.

An example of preferred closure members are the pairs of the Scotchmate TM closure system available from 3M Company, St. Paul, MN. (having matable "loop" strip and "hook" strips).

Closure members are preferably provided in a size suitable to substantially traverse the entire width of the sheet material, i.e., from the inner edge (less the width taken up by any padding that may be used) to the outer edge. Closure members that traverse the width in this manner lessen the possibility than an animal can insert a paw or other body part into a gap between overlapping portions in order to force open the collar assembly.

Closure members can be any suitable width, depending on the type of closure member and the desired application. For instance, closure members that are too narrow can tend to reduce the strength of the resulting attachment between the closure members. On the other hand, the wider the closure members become the stronger the overall attachment will generally be, but the more chance there is that the closure members can be incorrectly aligned when the collar assembly has been removed and is being reapplied.

Using the preferred closure members of the present invention, the width of the closure member will depend, as will become apparent to those skilled, on both the overall size of the collar assembly and on the availability of closure members in various widths. The width will generally be about one-fifth to about one-twentieth, e.g., and preferably on the order of one-tenth, of the length of the inner edge. Closure members that are wider than this, proportionally, tend to be unnecessary and too difficult to remove, and add unnecessary cost to the collar assembly. Closure members that are narrower than this tend to be less able to hold the collar assembly in its fitted shape, particularly when subjected to repeated pressure by the animal.

Preferably the collar assemblies of the invention are provided to the user, e.g., to the veterinarian, with one closure member already attached to an end portion of the sheet. Optionally, both closure members could be provided unattached to the sheet and attached at the time collar assembly is fitted.

Using the preferred closure assembly for instance, the hook side of a Scotchmate TM brand closure assembly is preferably attached to the sheet at the time of manufacture, and the loop side is provided engaged to the hook side, its pressure sensitive adhesive backing covered by a releasable liner.

Collar assemblies of the present invention can optionally include other structures and parts to the extent such structures or parts do not significantly interfere with the intended use or function of the collar assemblies. For instance, collar assemblies will preferably have padding on the inner edge of the sheet material, in order to pad points of contact between the fitted collar and the animal's neck. Padding can provide a fit that is more snug, and can help alleviate or avoid chafing of the animal's neck by repeated rubbing of the collar.

Any material suitable for the purpose of padding the collar assembly can be used, e.g., in terms of cushioning, durability, availability, and cost. Many commercially available materials include various forms of rubber, silicone, sponge, foams, and the like.

Padding can be applied in any suitable manner, e.g., it can be adhered, crimped, clamped, integrally molded, and/or physically retained (e.g., within a groove).

Collar assemblies can also optionally be provided with means for attaching (i.e., "anchoring") the collar assemblies to another collar, e.g., to the animal's own collar, in order to ensure that the animal cannot force the entire collar assembly off its head by repeated pressure with its paw.

Collar assemblies of the present invention can be used in any situation in which limited contact between an animal's head or mouth and the rest of its body is desired. For example, collar assemblies can be used for the post-surgical protection of incisions, wound and dressing protection, the protection of dermatological test sites, and the management of dermatological problems. Particularly suitable applications include the protection after eye and ear surgical procedures, as well as after limb and abdomen surgical procedures.

Since collar assemblies can be made to be relatively inexpensive and are fitted and intended for short-term use on a single animal, they are generally disposable after use.

The present invention will be further described with reference to the following non-limiting EXAMPLE.

EXAMPLE

A collar assembly of the present invention was prepared and used in the following manner.

A 0.5 mm thick sheet of polyethylene terephthalate ("PETG") (Kodar TM, Product No. 6763, Eastman Chemical Products, Inc., Kingsport, TN) was obtained, having a thin plastic protective coating on both surfaces, which was kept in place throughout fabrication.

Collar-forming sheets were die cut from the PETG sheet using a standard steel rule die. Two collar sizes were prepared, one having a width (i.e., distance between the inner and outer edges) of 15 cm, and the other a width of 25 cm.

A Scotchmate TM hook and loop fastening system, product numbers SJ-3526 (hook) and SJ-3527 (loop)) was obtained as a 1 inch (2.54 cm) by 50 yard (45.7 m) roll from 3M, Industrial Specialties Division, St. Paul, MN. These products are black in color and each have a pressure sensitive adhesive layer covered by a liner on their surface opposite the hook and loop surfaces. Each of the products were cut to the desired length and releasably engaged prior to attaching the assembly to the collar material.

A U-shaped foam padding (product #62-1/64-B-7) was obtained from Trim-Lok Inc., Paramount, CA. The padding has a black vinyl outer coating and has inner aluminum clips that can be crimped in order to retain the padding in place.

Labels having a pressure sensitive adhesive backing were also printed, having substantially the same dimensions as the final closure assembly.

The parts were cut with a scissors and assembled in the following manner: (1) cutting the padding to the length of the inner edge; (2) applying the cut padding by positioning it on the inner edge and crimping the aluminum clips in place; (3) cutting the mated closure assembly to approximately the width of the collar material, less the distance taken up by the padding; (4) applying the hook side of the closure assembly at or near one end of the collar material by removing the appropriate liner and pressing the closure assembly firmly in place. Labels were also positioned by adhering them to the opposite surfaces of the sheet materials, superimposed over the position of the closure assemblies.

The collar assemblies were each found to provide exceptional fit, permanence, comfort, and effectiveness when used on small animals in situations calling for such protection. Moreover the collar assemblies were easily removable and later re-positioned to again achieve the desired fit.

What is claimed is:

1. A custom-fittable, protective collar assembly capable of being fitted, removed, and thereafter reapplied in a compliant manner, said collar assembly comprising:

(1) a substantially flat collar-forming sheet of resiliently flexible material having inner and outer arcuate edges generally concentric about a common axis, said edges extending between first and second ends of said sheet, said sheet being adapted to be bent in order to overlap portions of said sheet adjacent said ends, thereby forming said material into the shape of a truncated cone with a substantial portion of said inner edge adapted to fit around the neck of an animal and (2) first and second elongate closure members, each of said closure members having an attachment surface adapted for releasable engagement with the attachment surface of the other closure member, each of said closure members also having a surface opposite said attachment surface, said first closure member being attached at its opposite surface to a portion of said sheet adjacent one of said ends and extending generally radially of said common axis, said second elongate member being releasably engaged to said first elongate member and having a layer of pressure sensitive adhesive on its opposite surface substantially covered by a releasable liner, whereby said assembly can be bent around the neck of an animal, with portions of said sheet adjacent said first and second ends overlapped to provide said releasable liner facing a desired location of an overlapping portion of sheet material, in order to form said material into the shape of a truncated cone with a substantial portion of said inner edge adapted to fit the neck of the animal;

said releasable liner can be removed to expose said adhesive layer and said exposed adhesive layer adhered by pressure at the desired location on said overlapping sheet material in order to retain said assembly in its fitted shape around the neck of the animal; and the engagement of said elongate closure members can be released and said assembly removed from the neck of the animal in a manner such that said assembly can be later bent again around the neck of the animal, and said elongate closure members again engaged to achieve substantially the same fit as that originally made.

2. A collar assembly according to claim 1 further comprising padding substantially covering said inner edge.

3. A collar assembly according to claim 1 wherein said closure assembly is a separable hook and loop fastening system.

4. A collar assembly according to claim 1 wherein said sheet material is optically clear.

5. A collar assembly according to claim 1 wherein the width of said closure assembly is about one-fifth to about one-twentieth of the length of said inner edge.

6. A method of fitting a protective animal collar in order to ensure compliant reapplication of said collar comprising the steps of (1) providing a collar assembly comprising
(a) a substantially flat collar-forming sheet of resiliently flexible material having inner and outer arcuate edges generally concentric about a common axis, said edges extending between first and second ends of said sheet, said sheet being adapted to be bent in order to overlap portions of said sheet adjacent said ends, thereby forming said material into the shape of a truncated cone with a substantial portion of said inner edge adapted to fit around the neck of an animal, and (b) first and second elongate closure members, each of said closure members having an attachment surface adapted for releasable engagement with the attachment surface of the other closure member, each of said closure members also having a surface opposite said attachment surface, said first closure member being attached at its opposite surface to a portion of said sheet adjacent one of said ends and extending generally radially of said common axis, said second elongate member being releasably engaged to said first elongate member and having a layer of pressure sensitive adhesive on its opposite surface substantially covered by a releasable liner, (2) bending said assembly around the neck of an animal, with portions of said sheet adjacent said first and second ends overlapped to provide said releasable liner facing a desired location of an overlapping portion of sheet material, in order to form said material into the shape of a truncated cone with a substantial portion of said inner edge adapted to fit the neck of said animal, (3) removing said releasable liner to expose said adhesive layer and adhering said exposed adhesive layer by pressure at the desired location on said overlapping sheet material in order to retain said assembly in its fitted shape around the neck of said animal.

* * * * *